Figure 10:
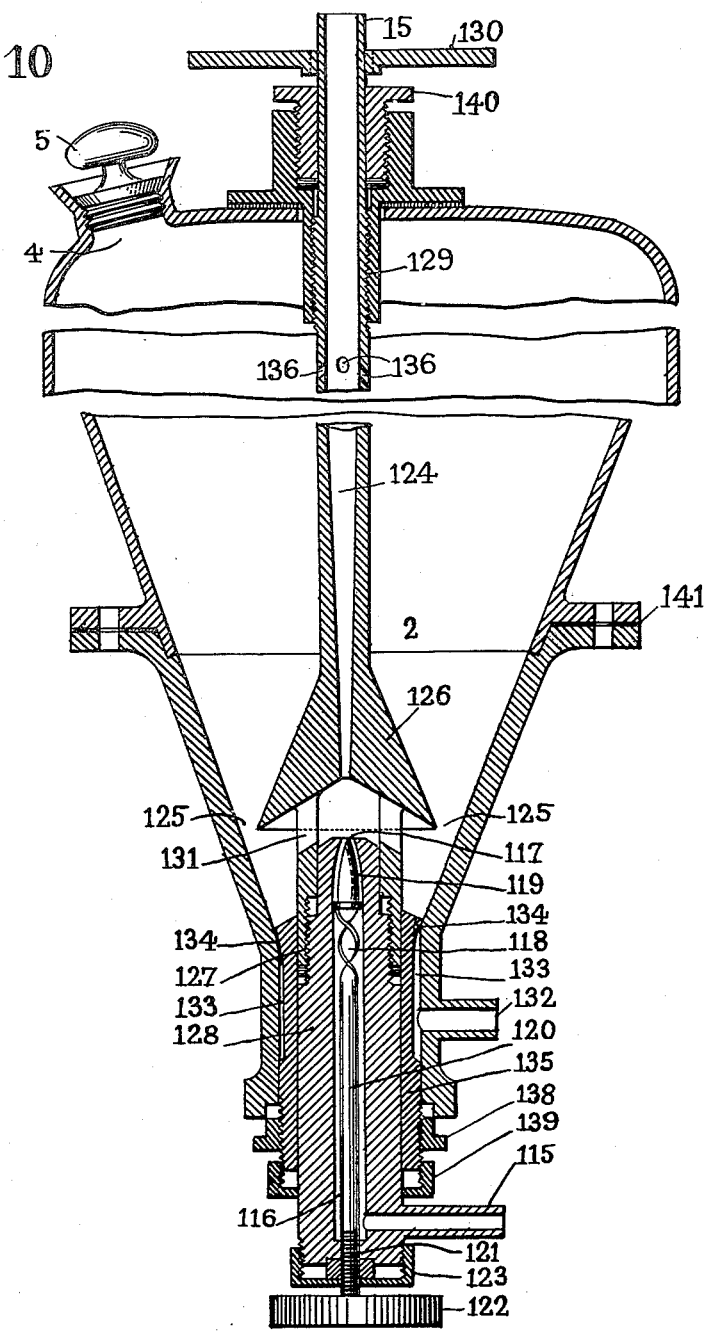

March 9, 1937.  F. P. C. BENOIT  2,072,845
APPARATUS FOR SPRAYING PULVERIZED MATERIALS
Filed July 19, 1934   5 Sheets-Sheet 1
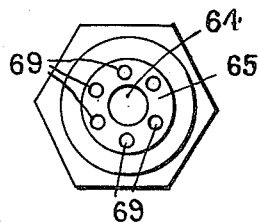
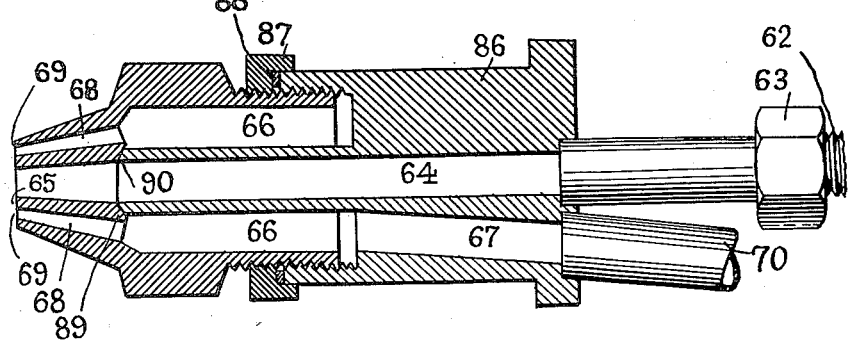
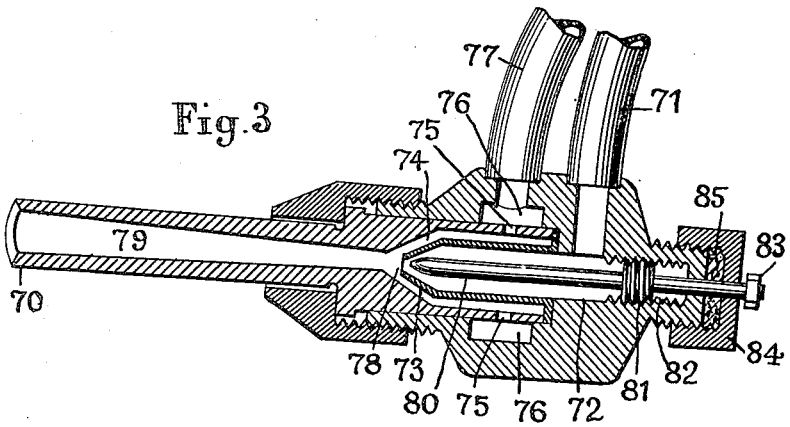

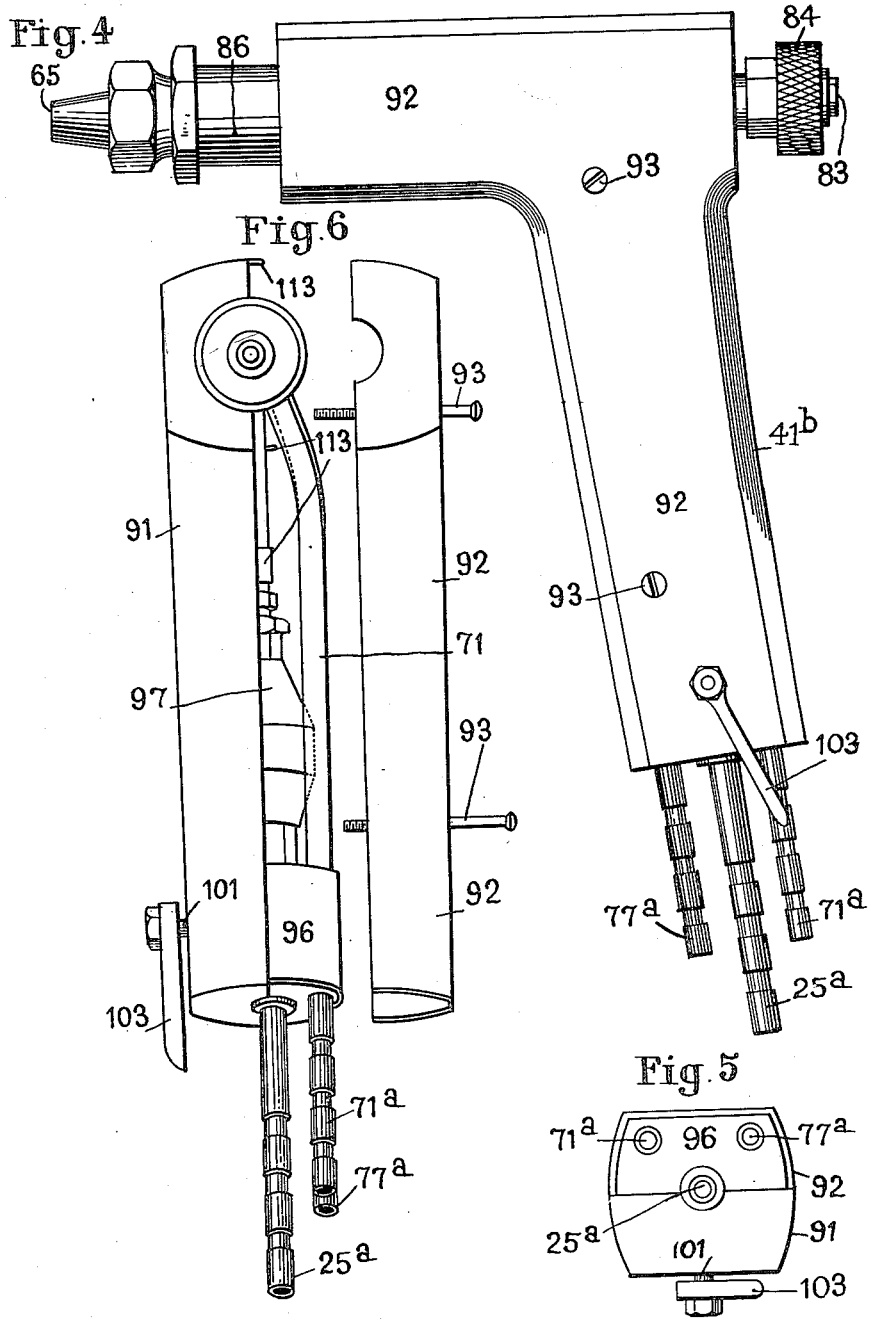

March 9, 1937. F. P. C. BENOIT 2,072,845
APPARATUS FOR SPRAYING PULVERIZED MATERIALS
Filed July 19, 1934 5 Sheets-Sheet 3
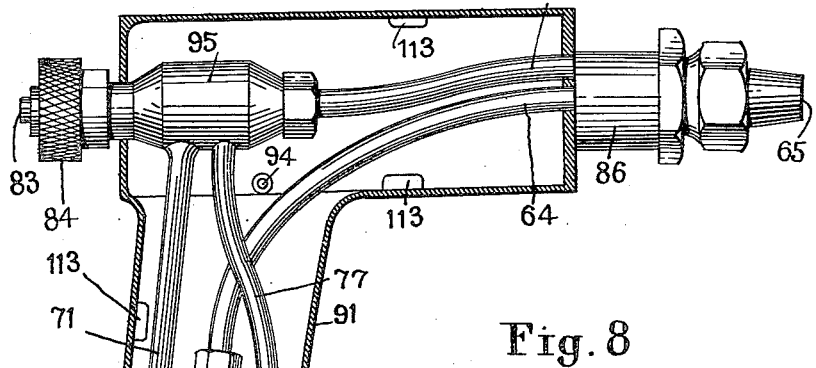
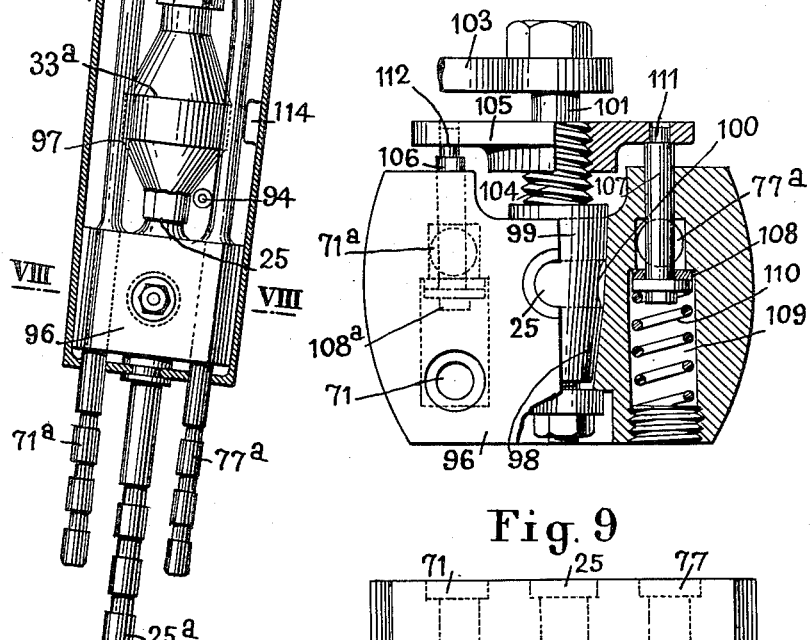
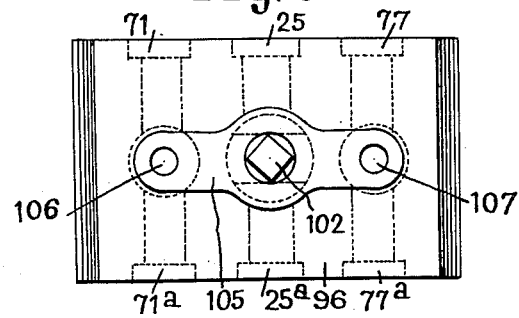
Inventor
François Philippe Charles Benoit
By
Pennie, Davis, Marvin & Edmonds
Attorneys.

March 9, 1937. F. P. C. BENOIT 2,072,845
APPARATUS FOR SPRAYING PULVERIZED MATERIALS
Filed July 19, 1934 5 Sheets—Sheet 4

Inventor
François Philippe Charles Benoit
By
Pennie, Davis, Marvin & Edmonds
Attorneys.

March 9, 1937. F. P. C. BENOIT 2,072,845
APPARATUS FOR SPRAYING PULVERIZED MATERIALS
Filed July 19, 1934 5 Sheets-Sheet 5
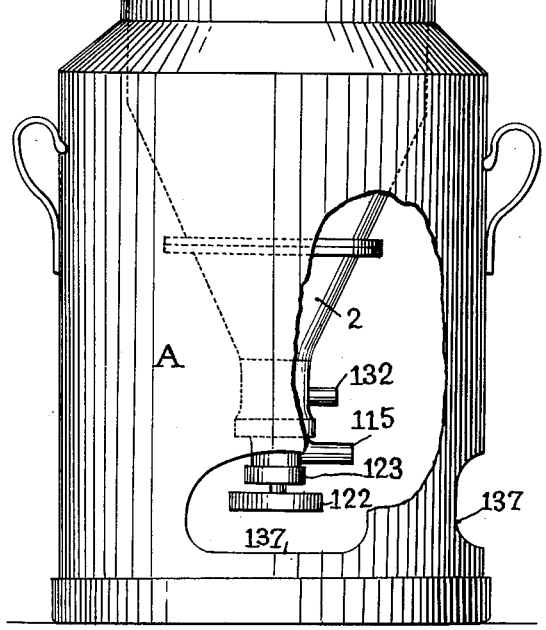
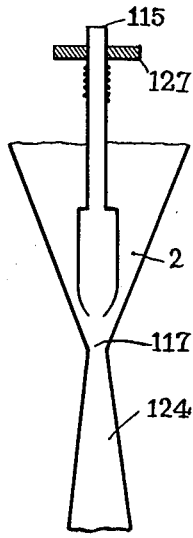
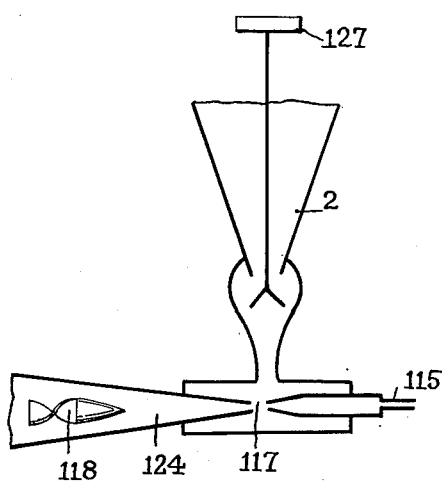
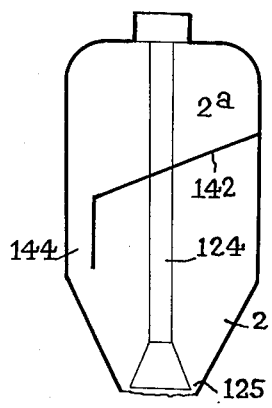

Patented Mar. 9, 1937

2,072,845

UNITED STATES PATENT OFFICE 2,072,845

APPARATUS FOR SPRAYING PULVERIZED MATERIALS

Francois Philippe Charles Benoit, Paris, France

Application July 19, 1934, Serial No. 735,993
In France November 18, 1933

6 Claims. (Cl. 91—12.2)

This invention relates to improvements in apparatus for spraying pulverized materials, in which the materials to be sprayed, first reduced to impalpable powder, are carried to the spraying gun by compressed air to which is imparted a gyratory helicoidal movement.

These improvements are concerned with the burner itself, disposed in the projecting gun, with the admission cock for the various fluids to this burner and with the reservoir or container of the pulverulent material. The burner is arranged in such manner as to produce at will an oxidizing, reducing or neutral flame, and the whole is arranged in such manner as to utilize combustible gases formed under very low pressure, and notably acetylene gas under the pressure at which this gas is prepared, that is to say under pressure only slightly greater than atmospheric pressure. The passage to the burner of the compressed air charged with pulverulent material is also regulatable so that there is available all the means necessary for regulating the nature, temperature and the length of the flame as well as the delivery of the pulverulent material.

In order that the invention be understood more fully, one particular embodiment is described by way of example with reference to the accompanying drawings in which:

Fig. 1 is a longitudinal axial section of the burner, Fig. 2 is a front view of the tip of the burner. Fig. 3 is an axial longitudinal section of the device supplying the combustible gases and comburents or supporters of combustion to the burner. Fig. 4 is a side view of the spraying gun with casing closed. Fig. 5 is a view from beneath the end of the handle. Fig. 6 is a rear view with the halves of the casing separated. Fig. 7 is a side view of the gun with one of the halves of the casing removed to show the internal arrangement. Fig. 8 shows to larger scale a section on the plane VIII—VIII of Fig. 7 of the valve assumed to be separated from the whole. Fig. 9 is a corresponding side view. Fig. 10 is an axial section of the reservoir for the pulverulent material proper. Fig. 11 is an elevation of the device mounted on a supporting enclosure part of the support being broken away; Fig. 12 is a diagram illustrating a modification of the reservoir for the pulverulent material acting on the same principle. Fig. 13 is a diagram illustrating a second modification and Fig. 14 a diagram of the supplementary arrangement employed with large capacity reservoirs.

As shown in Fig. 1 the burner terminating in a tip 65 has an axial passage 64 through which the mixture of powder and compressed air passes to the central part of the tip and it comprises an annular mixing chamber 66 into which the comburent and combustible gases supplied as hereinafter indicated pass by way of the passage 67. The gases mixed in the chamber 66 leave the tip of the burner through convergent nozzles 68, the openings 69 (Fig. 2) of which, six in number for example, are located at the corners of a regular hexagon.

The gaseous mixture is prepared separately in a mixing apparatus connected and fixed to the rear of the burner by the tube 70 (Figs. 1 and 3). This apparatus comprises an air inlet 71 discharging under pressure, 1.5 to 2 kg./cm. 2 for example, into an axial passage 72 whence it passes by way of the convergent nozzle 73. This arrangement produces a suction in the surrounding inlet chamber 74 which communicates by the orifice 75, by the chamber 76 and by a conduit 77 with a source of acetylene gas, which gas need not be compressed and may be merely at the pressure at which it is produced, that is to say at a pressure only slightly greater than atmospheric pressure. The gaseous mixture thus formed reaches the neck 78 of the nozzle and follows the divergent core 79 formed in the tube 70 which leads it at 67 into the mixing chamber 66 of the burner.

The delivery of compressed air may be regulated at the outlet of the convergent nozzle 73 by means of a needle valve 80 having an operating head 83 screwed at 81 into the threaded portion 82. A stuffing box 84 ensures tightness by screwing up more or less, on a packing 85.

The burner proper with its mixing chamber 66 is screwed onto the member 86 (Fig. 1) comprising the conduit 64 and 67. It is screwed until the conical portion 90 at the end of the conduit 64 bears tightly against the conical seating 89 of the tip 65 of the burner. The members are then held in this position by means of a locking nut 87 with an interposed packing washer 88, made of lead for example.

These various parts are mounted as shown in Figs. 4–7 in a casing which constitutes both the body of the gun and the handle portion serving for operating it, so that a very compact and easily operated unit is provided. A valve located preferably at the lower end of the handle permits of opening or of closing, by a single operation, the supply of the various fluids in the desired order and of obtaining rapid closure in the desired order of the fluid inlet passages in case of any untoward occurrence arising in operation.

The gun comprises a casing in two parts 91, 92 connected by bolts 93 screwed into the nuts 94.

The burner proper 65 projects at one end from its casing as also the member 86 by which there is conveyed to the burner on the one hand the combustible mixture supplied by the tubes 70 and on the other hand the current of air containing the powder in suspension supplied by the tube 64. The combustible mixture is produced in the receptacle 95 to which is supplied the comburents, air or oxygen, as previously described by the tube 71 and the acetylene or other combustible gas by the tube 77; the valve 96 controls the supply of these fluids, 84 indicating the stuffing boxes and 83 the regulating head provided externally of the casing.

The air charged with powder supplied to the burner by the tube 64 comes from the device 97 which is in two parts screwed to one another as indicated at 33a and which encloses the helicoidal blades intended to impart to the air charged with powder, the desired helicoidal gyratory movement. This air charged with powder passes by way of the tubes 25a, the delivery of which is controlled also by the valve 96.

This valve is shown to enlarged scale in Figs. 8 and 9. It is intended to permit of opening, first, the supply of oxygen or air by the tube 71a, and then the inlet of acetylene or other combustible gas by the tube 71a, and finally the inlet of the current of air charged with powder through 25a. For this purpose the body proper 96 of the valve is formed with a central bush 98 in which turns a cone 99 which is formed with a passage 100 and is integral with a rod 101 which terminates externally of the casing of the gun in a square portion 102 to which is fixed a key 103.

The rod 101 has a screw thread 104 on which is screwed a cross bar 105 traversed by the ends of two movable rods 106 and 107 which are guided in rectilinear movement parallel to the axis of the cone 99; consequently, the bar 105 cannot turn.

The rods 106, 107, the former slightly shorter than the second, are each integral with a valve of which one, 108, shown in half section (Fig. 8) may interrupt or permit communication between the tube 71a, which terminates beneath the cock 96, and the tube 77 fixed above it, which tubes are connected by the central space 109; for the sake of clearness of illustration the tube 77 is omitted in Fig. 8 but on the other half of the cock symmetrical with the first are shown the relative corresponding positions of the tubes 71a and 71 to which the valve 108a corresponds. A recoil spring 110 normally holds valve 108 on its seat so as to interrupt the passage of fluid through 71a and 77. A symmetrical arrangement is similarly formed between 71a and 71.

If we assume that in starting from the position shown in Fig. 8 in which everything is closed, the key 103 is acted on then the rod 101 is made to turn in a suitable direction.

The bar 105 which cannot turn will be moved by the screw thread 104 towards the body 96 of the valve and since it is at this moment in contact with the shoulder 111 of the rod 107 it will move this rod compressing the spring 110, and will open the passage from 71a to 77, that is to say will permit the inlet of oxygen or air.

On continuance of the movement the bar 105 will come into contact with the shoulder 112 of the rod 106 located lower than the shoulder 111 of the rod 107, which is assumed to be longer than the rod 106. The latter being moved in its turn compressing its spring, not shown, will permit the passage of acetylene between 71a and 71.

Continuing the movement of rotation of the key 103, and the opening of the supply of comburent and combustible gases being complete, the cone 99 will bring the passage 100 into communication with the tubes 25a and 25 located in alignment with one another, and will thus permit the passage of air charged with powder, this opening being complete when the cone 99 has made a quarter of a revolution.

It will be seen that the admissions of the different fluids to the gun is effected exactly in the order indicated above. Closure is effected in the inverse order and by the inverse operation which may be effected very rapidly on the occurrence of any disturbance in operation.

The proper fitting of the two parts 91, 92 of the casing is ensured by grooves 113 of suitable number.

The tubes 71a, 71a and 25a are connected respectively to the sources of comburent gas, combustible gas and compressed air charged with powder and the gun is held in the hand by the part 41b (Fig. 4) which constitutes the handle. The operator may thus easily direct the flame leaving the burner 65 and operate with his free hand the key 103 of the cock and the regulating head 83 of the burner.

In order to permit of regulating in exact manner the quantity of powder carried in suspension in a definite volume of air, the compressed air passes through the low part of the powder receptacle by way of a true injector and is given a helicoidal movement. On leaving the injector it carries, by suction action, a certain quantity of powder contained in the reservoir. This powder is agitated by the helicoidal movement of the air, and is finely divided in a divergent cone, in which expansion of the compressed air takes place. Suitable arrangements (not shown) are provided to prevent the possible agglomeration of the powder.

In Fig. 10 is indicated at 2 the reservoir proper in which are contained the powders which are introduced by an opening 4 fitted with a screw threaded plug 5.

The compressed air serving as a vehicle for the powders passes to the lower part of the apparatus by the tube 115, the annular passage 116 and the injector 117. This air due to the helix 118 receives a helicoidal movement. Its delivery may be regulated by means of the needle valve 119 which should enter to a greater or smaller extent the opening of the injector 117; to this end the rod 120 is screwed at 121 in the base of the apparatus. It may be rotated by means of the stud 122. A stuffing box 123 ensures tightness.

On leaving the injector 117 the compressed air entrains by suction action a certain quantity of the powder contained in 2 and divides it finely into the divergent cone 124 where a certain expansion of the compressed air takes place. The divergent cone 124 leads to the tube 15 by which the powder reservoir is connected to the projecting gun.

The delivery of the powder is regulated by varying on the one hand the distance between the opening 117 and the inlet of the divergent cone 124 and on the other hand the section of the passage at 125. The first regulation is effected by screwing the member 125 at 127 more or less onto the member 128. The second regulation is effected by means of the screw thread 129 which permits of the members 124 and 126, operated by means of the handwheel 130, being lowered more or less within the reservoir 2. The openings 131 permit the passage of the powder to the divergent cone 124.

In order to avoid possible agglomeration of the powder in the lower part of the apparatus a second supply of compressed air is effected by the branch 132 and the annular space 133. Grooves 134 are in fact formed on the conical surface by which the member 135 bears on the inner wall of the reservoir 2. These grooves 134 are of helicoidal form. The helicoidal jets of compressed air, leaving 134 tangentially of the internal conical surface of the reservoir 2, sweep the powder into this part and impart to it a turbulent motion which facilitates the suction action and their passage into the divergent cone 124.

In order, moreover (consequent on this supply of compressed air) to prevent a rise in pressure in the reservoir 2, orifices are provided at 136 in the wall of the tube 124. Air under pressure escapes by these orifices, which are inclined in a direction such that they facilitate the suction action produced at the inlet of the tube 124. A mixture of the two currents of compressed air which are both charged with powder takes place because the air which arrives by the branch 132 and the grooves 134, also carries entrained powder.

Independently of the regulation already indicated of the section of the passage at 125 and of the distance of the orifice 117 from the inlet of the divergent cone the delivery may be varied either by variation of the pressure of the air at the outlet of the injector or by varying its outlet orifice.

It will be seen that these various regulations permit of using a mixture of air or powder of variable density, as desired. The compressed air contacts with the powder to be divided and carries it in suspension to the lower part of the apparatus and it is this air which serves as a vehicle for the powder, the deposit of the latter within the passages in which it is caused to circulate being prevented by the turbulent motion of the air which effects continuous entrainment of the powder to the point where it is to be used.

The same principle is applicable in different forms of which two are indicated diagrammatically in Figs. 12 and 13. In Fig. 12 it will be seen that the injector is still disposed vertically but that the current of air is directed downwardly in lieu of upwardly as shown in Fig. 10.

In Fig. 13 the injector is disposed in a horizontal direction, compressed air being supplied at 115 and the helicoidal device 118 being disposed in the divergent cone 124. The reservoir for the pulverulent material is disposed above the orifice 117 of the injector, the passage of the powder being regulatable by means of a hand wheel 127.

Other embodiments may be provided within the scope of the invention.

The reservoir for pulverulent material may be mounted in a support A holding it vertical and provided with handles or other means permitting of shifting it easily. Openings 137 of any suitable form and number permit of easy access to the regulating handwheel, stuffing boxes, air pipes etc., for operation of the apparatus.

In addition to those already indicated in the specification, stuffing boxes 138, 139, 140 are provided at all suitable points.

The apparatus is normally constructed in a number of parts. It comprises a cover connected to the body proper by a joint of suitable type ensuring tightness and permitting easy opening and closing. The body itself of the apparatus may be in two parts connected at 141 by a suitable form of joint. The upper light part can be pressed and the lower part which should be worked with precision can be formed in different manner.

In Fig. 14 is shown diagrammatically an accessory device suitable for reservoirs of large capacity for preventing the heavy weight of powder settling at 125, (Fig. 10). This arrangement is formed by an intermediate partition 142 which supports the main weight of the powder carried in 2a. The latter descends at 125 only as required through a passage 144 suitably arranged. In lieu of a continuous partition such as shown at 142 gratings, formed for example of layers of cylindrical parallel bars spaced and arranged in quincunx, and fixed across the reservoir, may be employed. These bars support a portion of the weight of the powder and prevent it from settling at 125 while allowing it to descend when required. The same principle is capable of numerous modifications.

Without departing from the limits of the invention, various modifications may be imparted thereto, concerned chiefly with the form of the parts, the inclinations of the walls of the reservoir, the angles of the convergent or divergent passages of the injector, the supports of the different parts and the method of operation and regulation of the movable parts. In particular the screw threaded part 129 may be replaced by an arrangement permitting the divergent tube 124 to rise and fall in the reservoir without rotating thereon in order to permit of regulating the section of the passage at 125.

What I claim is:—

1. Apparatus for the projection of bodies in the pulverized and molten state reduced beforehand into impalpable powder, comprising a burner, said burner having means for receiving, among others, a gaseous fluid under pressure bearing said powder, said burner presenting an axial conduit, said conduit providing a way for the passage of the said gaseous fluid under pressure, said fluid being charged with the powders, nozzles arranged about said axial conduit for the passage of a mixture of gases, said mixture comprising a combustible gas and a combustion-supporting gas, an annular mixing chamber surrounding the said axial conduit, said chamber communicating with the said nozzles, means comprising an injector for supplying the said gas mixing chamber with a mixture comprising a combustion-supporting gas and a combustible gas, a conduit for the admission of the current of said combustion-supporting gas and said combustible gas, a conduit for the admission of the current of gaseous fluid charged with powders, means for controlling the arrival of the different fluids, a casing formed in two parts, all the said control means and the burner being mounted in and upon said casing, said casing being easily openable and having the general form of a pistol.

2. Apparatus for the projection of bodies in the pulverized and molten state reduced beforehand into impalpable powder, comprising a burner, said burner having means for receiving, among others, gaseous fluids under pressure, said fluid bearing said powder, the said burner presenting an axial conduit for the passage of the said gaseous fluids under pressure charged with powders, nozzles arranged around the said axial conduit for the passage of a mixture of gases, said mixture comprising a combustible and a combustion-supporting gas, an annular mixing chamber surrounding the said axial conduit, said chamber communicating with the said nozzles, means comprising an injector for feeding the said mixing chamber with a mixture comprising a combustion-supporting gas and a combustible gas, a conduit for the admission of the current of gaseous fluid charged with powders, means for controlling the arrival of the various fluids, a casing in two parts, the said control means being grouped in said casing in two parts, the said casing being constructed in the form of a pistol having a handle, said pistol carrying at one end the burner and, carrying, at the bottom of the part forming a handle, the means of controlling the arrival of the various fluids, the said means being constituted by a stopcock with three channels for three distinct fluids.

3. Apparatus for the projection of bodies in the pulverized and molten state reduced beforehand into impalpable powder, comprising a burner said burner having means for receiving, among others, gaseous fluids bearing said powder, the said burner presenting an axial conduit for the passage of the gaseous fluid under pressure charged with the powders, nozzles arranged around the said axial conduit for the passage of a mixture of gases, said mixture comprising a combustible and a combustion-supporting gas, an annular mixing chamber surrounding the said axial conduit and communicating with the said nozzles, means comprising an injector for feeding the said mixing chamber with combustion-supporting gas under pressure and a combustible gas, a conduit for the admission of the current of gaseous fluid charged with powders, means for controlling the arrival of the different fluids, a casing in two parts, the said control means being grouped in said casing in two parts, the said casing being constructed in pistol form having a handle, said pistol carrying at one end the burner and, at the bottom of the part forming a handle, carrying the means for controlling the arrival of the different fluids, the said means comprising a stop-cock having three passageways, one for the passage of the combustion-supporting fluid, one for the combustible fluid, and one for the gas charged with powder, reciprocating valves in the first two passageways provided with stems, a rotatable valve in the last-mentioned passageway, means carried by said last-mentioned valve arranged to depress first the stem of the valve controlling the combustion-supporting gas and next that controlling the combustible gas, and a key for rotating said rotatable valve a quarter of a turn after the last valve has been depressed, for assuring the arrival of the gas charged with powder.

4. Apparatus for projecting pulverulent bodies reduced preliminarily to impalpable powder comprising in combination with a burner, said burner including an axial passage for the delivery of a gaseous stream under pressure charged with powder, nozzles for the delivery of a mixture of combustible and comburent gas disposed around the said axial passage, and an annular mixing chamber provided around the said axial passage and communicating with said nozzles, means for supplying to said mixing chamber comburent gas under pressure and combustible gas, said means including an injector device by which the comburent gas is delivered, said injector having a convergent nozzle, means for supplying combustible gas around said nozzle and means for regulating the supply of comburent gas to the nozzle of the injector device, means providing a gaseous stream charged with powder, said means including a powder container, an inlet for compressed air on said container, an injector device within said container, said injector device adapted to exert a suction action on the powder in the container and entrain it into the projection apparatus and helical blades for imparting to the compressed air a turbulent motion.

5. Apparatus for projecting pulverulent bodies reduced preliminarily to impalpable powder comprising in combination with a burner, said burner including an axial passage for the delivery of a gaseous stream under pressure charged with powder, nozzles for the delivery of a mixture of combustible and comburent gas disposed around the said axial passage, and an annular mixing chamber provided around the said axial passage and communicating with said nozzles, means for supplying to said mixing chamber comburent gas under pressure and combustible gas, said means including an injector device by which the comburent gas is delivered, said injector having a convergent nozzle, means for supplying combustible gas around said nozzle and means for regulating the supply of comburent gas to the nozzle of the injector device, means providing a gaseous stream charged with powder, said means including a powder container, an inlet for compressed air on said container, an injector device within said container, said injector device adapted to exert a suction action on the powder in the container and entrain it into the projection apparatus, helical blades for imparting to the compressed air a turbulent motion, and a tangential inlet for compressed air to the lower walls of the container.

6. Apparatus for projecting pulverulent bodies reduced preliminarily to impalpable powder comprising in combination with a burner, said burner including an axial passage for the delivery of a gaseous stream under pressure charged with powder, nozzles for the delivery of a mixture of combustible and comburent gas disposed around the said axial passage, and an annular mixing chamber provided around the said axial passage and communicating with said nozzles, means for supplying to said mixing chamber comburent gas under pressure and combustible gas, said means including an injector device by which the comburent gas is delivered, said injector having a convergent nozzle, means for supplying combustible gas around said nozzle and means for regulating the supply of comburent gas to the nozzle of the injector device, means providing a gaseous stream charged with powder, said means including a powder container, an inlet for compressed air on said container, an injector device within said container, said injector device adapted to exert a suction action on the powder in the container and entrain it into the projection apparatus, helical blades for imparting to the compressed air a turbulent motion and an intermediate partition in said container serving to support in part the weight of the powder.

FRANCOIS PHILIPPE CHARLES BENOIT.